Figure 1:
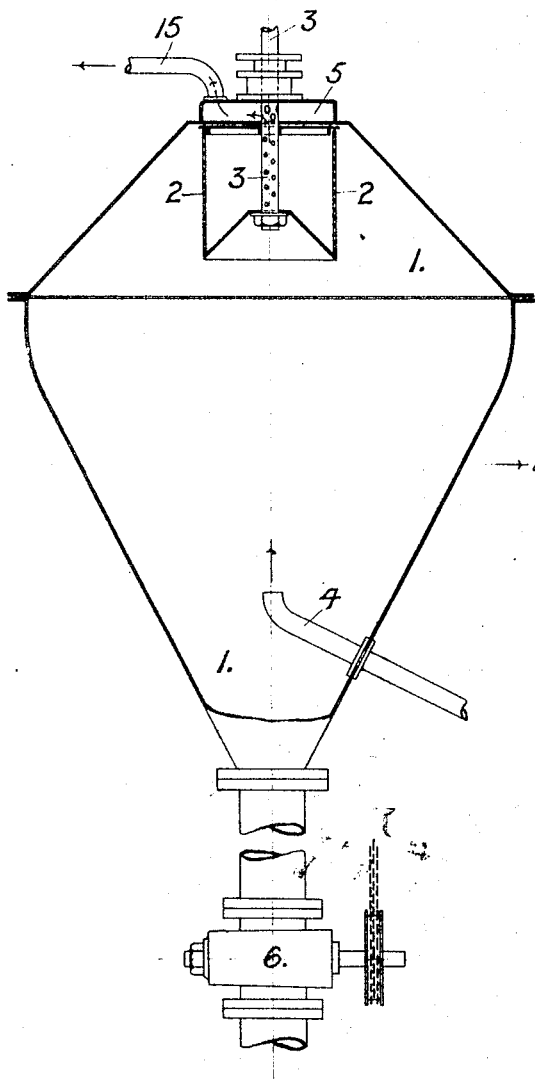

J. E. HATTON & J. P. SALA.
PROCESS OF CENTRIFUGAL SEPARATION.
APPLICATION FILED FEB. 24, 1911.

1,025,059.

Patented Apr. 30, 1912.
2 SHEETS—SHEET 1.

Witnesses
W. A. Williams
F. M. Meyer

Inventors
J. E. Hatton
J. P. Sala

Atty.

J. E. HATTON & J. P. SALA.
PROCESS OF CENTRIFUGAL SEPARATION.
APPLICATION FILED FEB. 24, 1911.
1,025,059.
Patented Apr. 30, 1912.
FIG. 3.
FIG. 4.
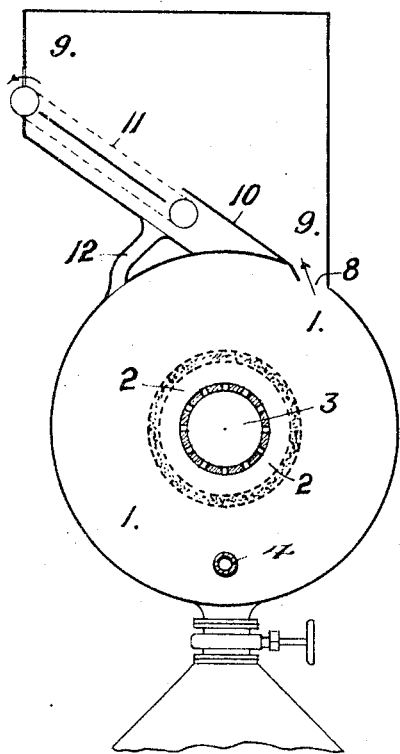
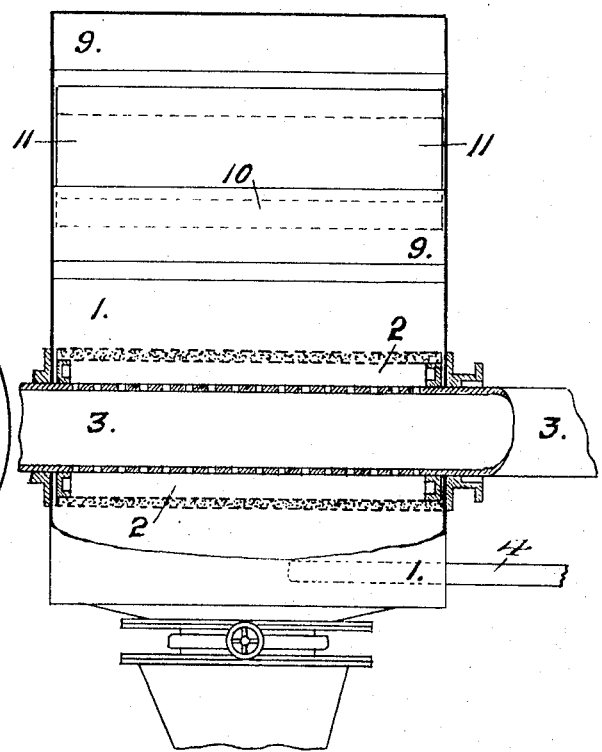
Witnesses
Inventors
J. E. Hatton
J. P. Sala

UNITED STATES PATENT OFFICE.

JOSEPH ELEUTERIO HATTON AND JOSÉ PABLO SALA, OF HABANA, CUBA.

PROCESS OF CENTRIFUGAL SEPARATION.

1,025,059.      Specification of Letters Patent.      Patented Apr. 30, 1912.

Application filed February 24, 1911. Serial No. 610,556.

*To all whom it may concern:*

Be it known that we, JOSEPH ELEUTERIO HATTON, a subject of the King of England, and JOSÉ PABLO SALA, a citizen of the Republic of Cuba, residing at Galiano, No. 101, and Obrapia, No. 19½, Habana, Cuba, respectively, have invented certain new and useful Processes of Centrifugal Separation, of which the following is a specification.

This invention has reference to the separation of solids or foreign matters, contained in liquid or fluid substances; and it is based on the application of centrifugal force; the manner, however, of the separation, differing substantially from that involved in centrifugal machines used for the purging of sugar, the separation of oil, drying grain, and so forth.

According to this invention, the vessel which contains the liquid to be filtered, is preferably fixed, and the substance to be purified or separated is centrifuged and made to rotate; the centrifuging and rotation being effected by a rotating body or means of cylindrical or other form, or other means; and the liquid in its passage through the apparatus from the inlet to the outlet, is brought under the influence and action of the centrifuging body of liquid. The body or means by which the centrifuging and rotation of the liquid is effected, causes the liquid to rotate at a high velocity.

All insoluble matter contained in a liquid tends to separate from the liquid, if a rotary movement is given to the liquid; and by centrifugal force all the solids or matters to be removed, are expelled from the center outward, and are therefore thrown off from the center outward to the greater perimeter or circumference described by the revolving liquids; while the center of the liquid mass will remain free of all solids or matters to be separated; and if the liquid containing solid particles or matters to be separated, is made to rotate at a high velocity inside of a receptacle at rest, all these contained solid particles or matters will be expelled from the center of gyration, toward the walls or sides of the containing vessel; while the center of gyration of the liquid will be free of solids, or matters. According to this invention, the liquid is centrifuged and rotated at a high velocity, a portion of it is taken off from the center of gyration, and a corresponding amount of liquid is fed and introduced into the vessel between the gyrating body of liquid, and the outlet, and at a pressure above that of the discharge as hereinafter specified. By so operating upon the liquid, the portion withdrawn will be free of solids or matters to be separated, which will be expelled outward toward the wall of the containing vessel from which they will fall, and be taken away.

The liquid supplied, on its way from the inlet to the discharge is caused to enter and traverse the gyrating mass of liquid, and being thereby projected centrifugally toward the vessel's side is subjected to the action described, and its solid particles or matters to be separated, are thrown off, and carried away from that point where the outlet for the discharge of purified and clear liquid is placed. It has been found necessary, in order to accomplish this satisfactorily, that the liquid fed into the vessel, must be at a different pressure to that at the outlet; the pressure being such that it will overcome the resistance due to the centrifugal force of the liquid being projected to the sides of the containing vessel.

In centrifugal machines generally in use at present, the maximum force is exerted at the perimeter or wall of the containing vessel; whereas, by the present method, the maximum force is exerted at the center, or close to the center.

In cases where the liquid to be purified, and the contained matters to be removed is passed through a filtering medium, it is passed from the outside, inward, toward the center of the apparatus; and this medium would be at or near the center of the gyrating body of liquid, and preferably on the rotating device or body by which the liquid is thrown away centrifugally, as stated. The solids or matters to be separated are thereby thrown off outward through the liquid by the centrifugal force; and the liquid which is being introduced into the apparatus, and has to pass through the filtering medium, is forced at a pressure above that within the outlet side of the medium, and overcomes the centrifugal force of the liquid, and so passes through the filtering medium; but as the solid particles or matters to be removed are thrown off away from the filtering medium, due to the centrifugal force, created by the rotating body and medium, they are prevented from reaching the medium; and hence it—the filtering medium—is kept free of all solids, which otherwise would obstruct the medium and soon bring the apparatus to a condition under which its action would cease.

The liquid to be purified or clarified, is maintained in a constant state of rotary flow, and a quantity of liquid is constantly added; while, at the same time, an equal quantity free of solids or matters, is being extracted from the center of the moving mass after having passed through the zone of centrifuging liquid.

The receptacle or body of the apparatus may be of various forms, and placed in different positions; while also the body or means that imparts rotary and centrifugal motion to the liquid may be of different forms or kinds.

Figure 2:
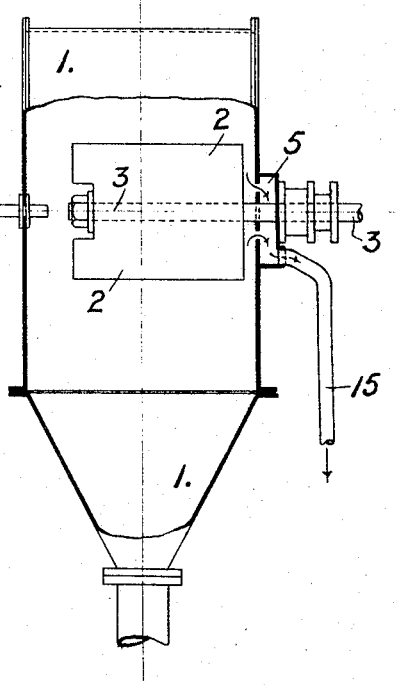

In Figures 1, 2, 3, and 4 of the drawings, some different arrangements or forms of apparatus are shown, and illustrate the invention. Fig. 1 represents an apparatus in which the general axis is vertical; Fig. 2 shows one wherein the axis is horizontal; and Figs. 3 and 4 respectively are cross and longitudinal sections of a modified apparatus wherein the axis is horizontally disposed, and there is connected with the receptacle a settling chamber.

In the vertically arranged apparatus shown in Fig. 1, the vessel 1 is in the form, generally, of two truncated cones connected by their bases; and 2 is the rotary body or means, submerged in the liquid, which gives it rotary and centrifugal motion. The body 2 in this case is of cylindrical form, and is mounted on and revolved by a hollow shaft 3, driven by a pulley or other means, externally.

The impure liquid, or liquid to be operated upon, is introduced into the vessel 1, below the body 2 by a pipe 4, at a substantial pressure—say about 10 lbs—above that in the outlet, which is constituted by the hollow shaft 3, the lower end of which is perforated; and thus it has to enter and traverse the centrifuging or rotating body of liquid that is being moved by the body 2, and in so doing attains the same rotating motion, with the result that the solid particles or matters to be separated, are thrown outward by centrifugal force through the liquid toward the wall of the vessel 1, and so do not reach the filtering medium on the body 2, and its surface is therefore kept clean and free of solids or matters carried in the liquid. As this filtering medium (which may be wire gauze, filtering cloth, felt, porous porcelain, or any other filtering medium) is maintained clean, and free of solids or contained impurities or matters as stated, by the physical action specified, the liquid is enabled to pass constantly through it, flowing toward, and reaching the perforated hollow axle 3,—the lower end of which is closed—it passes into it and is carried away through its upper end, or through the chest 5 and pipe 15.

In the case where the revolving body 2 is solid, or without perforations, the same rotative and centrifuging action of the liquid takes place; and after passing into and through the gyrating stream is rid of its solid or contained matters, and arrives at the opposite side of the revolving liquid body to that at which it was supplied by the pipe 4, and leaves by the pipe 15, through a hole or holes in the chest 5, purified or rid of solids or contained matters. This liquid can be purified or clarified in cases where a filtering medium covering the revolving body 2 is used; or without it, as explained above, the latter being especially applicable in cases where the solids or matters contained are of a high specific gravity.

It is to be noted that this purifying or clarifying apparatus and system is in some cases, a closed one, and worked under pressure; and that whereas in an apparatus where a liquid containing solid or foreign matters are passed through a filtering medium, and such matters are retained on its surface, which becomes stopped up by them, and the action in consequence ceases; by the present apparatus and mode of operation, the filtering medium is maintained constantly clean and free of all precipitates or solids. The extracted or separated solids or precipitates in this apparatus may be effected in any suitable way. In action, as the solids or contained matters move farther from the center of the revolving body of liquid their velocity diminishes, and they descend by gravity to the bottom of the vessel 1, which is at a considerable distance from the center of rotation. From the bottom they may be removed by a revolving valve or trap door device 6, which, as it revolves receives the separated material, and then discharges it out below, in the well-known way of such discharging means.

In some cases the solids or separated matters are taken away from the upper part of the apparatus, and Figs. 3 and 4 show an arrangement which enables this to be done. The liquid, which is introduced, say at a point below the horizontal rotating body 2, into the vessel 1 is rotated and centrifuged by the body, and the solids or matters contained in the liquid, are thrown by the centrifugal force outward to the walls of vessel; and as the solids carried by the revolving liquid reach a slot 8 in the wall of the vessel 1, they leave it tangentially, and enter an outer depositing vessel 9; and moving in a stream tangentially or obliquely in this vessel 9, they pass over an inclined plate 10, and fall onto an endless conveyer 11, which carries them along and discharges them outside the vessel 9. The liquid carried into the vessel 9, flows back into the vessel 1 by the conduit 12.

Should the filter be obstructed by an unforeseen cause, it can be cleaned by passing clear water in a contrary direction to the normal direction; and by the centrifugal force created in the liquid by the body 2 being revolved during this cleaning action, the clear water will carry off any sediment adhering to the surface of the body 2. By so operating the filter is maintained clean, and the filtering medium remains useful, as long as it is not torn or worn out.

In the horizontally arranged type of apparatus, namely, that in which the revolving body has its axis horizontal—shown in Fig. 2, the upper part of the case is of semi-cylindrical shape, and the sides vertical; while the bottom is conical. The body 2 which gives motion to the liquid may be hollow and perforated, and covered with a filtering medium; or it may be solid, and similarly as in the apparatus above described.

The liquid enters the apparatus by the pipe 4, and receives rotary motion, similarly as above described, and with the same effects and results: and it leaves the apparatus freed of solid particles or other matters, through the hollow perforated axle 3, or through a pipe 5. The liquid is always best extracted from a point at or near to the center of the revolving body 3.

Some of the advantages of this method of, and apparatus for the purification and clarification of liquids are: The operation is automatic and continuous; extraction of the impurities or contained matters is mechanical; and the filtering or purifying surface of the filtering or purifying medium—when used—is kept clean and open.

This invention is applicable for all or most industries, where filters are required, including sugar manufacture, breweries, mines, salt factories, et cetera; for the purification of water for public use, and for other purposes.

Having now particularly described and ascertained the nature of our said invention and in what manner the same is to be performed, we declare, that what we claim is:—

1. The method of separating solids or matters contained in a liquid, from said liquid, consisting in rotating and centrifugally treating a liquid by a body revolving in it; introducing the liquid to be treated into and passing through a portion of the rotating and centrifuging liquid which is away from said revolving body and effecting the separation of the matter to be removed in the body of liquid thereby, without coming in contact with the revolving body; substantially as set forth.

2. The method of separating solids or matters contained in a liquid, from said liquid, consisting in centrifuging and rotating the liquid; introducing liquid to be treated into the rotating and centrifuging liquid under treatment, at a pressure above that of the liquid at the point of discharge such as specified, which will overcome the centrifugal force; effecting separation in the body of centrifuging liquid; and withdrawing it from a point where centrifuged liquid exists; substantially as set forth.

3. In a method of centrifugally separating solids from liquids, introducing the liquid to be treated directly into the interior of a body of centrifuging liquid at a pressure above that of the liquid at the point of discharge.

4. In a method of centrifugally separating solids from liquids, introducing the liquid to be treated into the interior of a body of centrifuging liquid, at a point in line with the axis about which the liquid is centrifuged, and between the opposite ends of the body of centrifuging liquid.

5. In a method of centrifugally separating solids from liquids, introducing the liquid to be treated into a body of centrifuging liquid, and centrifuging the interior portion of the body of liquid at a higher angular velocity than the outer portion.

6. In a method of centrifugally separating solids from liquids, introducing the liquid to be treated directly into a body of centrifuging liquid; centrifuging the interior portion of the body of liquid at a higher angular velocity than the outer portion; and bringing some of the liquid to an approximate quiescent state during the centrifuging of the liquid.

7. In a method of centrifugally separating solids from liquids, introducing the liquids to be treated into a body of centrifuging liquid; and alternately centrifuging and bringing to an approximate state of quiescence the liquid under treatment.

8. In a method of centrifugally separating solids from liquids, introducing the liquid to be treated into a body of centrifuging liquid; alternately centrifuging and bringing to an approximate state of quiescence the liquid under treatment; and settling out some of the solids while the liquid is in the state approximating quiescence.

9. In a method of centrifugally separating solids from liquids, introducing the liquid to be treated into a body of centrifuging liquid; centrifuging and bringing to an approximate state of quiescence the liquid under treatment; settling out some of the solids from the liquid when it is in the state approximating quiescence; and screening the liquid while it is in the said state.

10. In a method of centrifugally separating solids from liquids, introducing the liquid to be treated into a body of centrifuging liquid; alternately centrifuging and bringing to an approximate state of quiescence, the liquid under treatment; settling out some of the solids from the liquids when it is in the state approximating quiescence; screening the liquid while it is in the said state; and returning the liquid after screening into the body of centrifuging liquid.

11. In a method of centrifugally separating solids from liquids, introducing the liquid to be treated into a body of centrifuging liquid; alternately centrifuging and bringing to an approximate state of quiescence, the liquid under treatment; settling out some of the solids from the liquids when it is in the state approximating quiescence; screening the liquid while it is in the said state; returning the screened liquid into the body of centrifuging liquid; and filtering the separated liquid.

12. Method of separating solids from liquids, consisting in alternately centrifuging and bringing to an approximate state of quiescence the liquids to be treated; introducing the liquid to be treated directly into the interior of the body of centrifuging liquid; effecting part of the separation in the body of liquid being centrifuged, and part in the liquid in the state of approximate quiescence; screening the liquid when in the state of approximating quiescence; returning the screened liquid into the body of centrifuging liquid; filtering the screened liquid; and removing the filtered liquid directly from the centrifuging body of liquid.

In testimony whereof we have signed our names to this specification in the presence of two subscribing witnesses.

JOSEPH ELEUTERIO HATTON.
JOSÉ PABLO SALA.

Witnesses:
HENRY R. SCARRETT,
C. STEWART O'NEILL.

---

Copies of this patent may be obtained for five cents each, by addressing the "Commissioner of Patents, Washington, D. C."